United States Patent [19]

Beuter

[11] Patent Number: 4,512,194
[45] Date of Patent: Apr. 23, 1985

[54] METHOD AND APPARATUS FOR CONTROLLING OR MEASURING THE THICKNESS OF MATERIAL LAYERS

[75] Inventor: Karl Beuter, Frankfurt am Main, Fed. Rep. of Germany

[73] Assignee: Battelle-Institut E.V., Frankfurt, Fed. Rep. of Germany

[21] Appl. No.: 448,913
[22] PCT Filed: Mar. 29, 1982
[86] PCT No.: PCT/EP82/00069
§ 371 Date: Dec. 1, 1982
§ 102(e) Date: Dec. 1, 1982
[87] PCT Pub. No.: WO82/03455
PCT Pub. Date: Oct. 14, 1982

[30] Foreign Application Priority Data

Apr. 1, 1981 [DE] Fed. Rep. of Germany ....... 3113025

[51] Int. Cl.$^3$ .............................................. G01N 29/04
[52] U.S. Cl. ......................................... 73/579; 73/602
[58] Field of Search .......................... 73/579, 602, 627; 367/101, 102

[56] References Cited

U.S. PATENT DOCUMENTS 3,474,664 10/1969 Mitchell et al. ...................... 73/627
3,624,712 11/1971 Welghart ............................. 73/627
4,305,294 12/1981 Vasile et al. .......................... 73/579

OTHER PUBLICATIONS

Muller, O., "Der Hochfrequenz-Spektrumanalysator als Messgerät in der Ultraschallresonaztechnik", vol. 25, No. 5, (1976) pp. 20-24.

Primary Examiner—Anthony V. Ciarlante
Attorney, Agent, or Firm—Fisher, Christen & Sabol

[57] ABSTRACT

In a method of controlling or measuring layer thicknesses, wherein a continuous frequency-modulated ultrasonic signal that periodically scans a frequency band is transmitted and wherein the resultant signal is evaluated. The frequency bandwidth is selected large enough that a multiple of the interference interval is covered. The spectral maxima or minima which periodically recur in the frequency spectrum of the received signal are evaluated. At a fixed modulation rate of the transmitted signal, an unambiguous interrelation exists between the repetition frequency of the maxima or minima in the spectrum and the thickness of the layer under examination. The repetition frequency increases with increasing layer thickness. According to an alternative embodiment of the invention, a ratio of harmonic amplitudes corresponding to the layer thickness is evaluated. The harmonics are produced by selecting a narrow frequency band, so that only part of the interference interval is covered. The repetition frequency of modulation is determined as a function of the desired measuring range.

6 Claims, 4 Drawing Figures

METHOD AND APPARATUS FOR CONTROLLING OR MEASURING THE THICKNESS OF MATERIAL LAYERS

BACKGROUND OF THE INVENTION

1. Field of the Invention

The invention relates to methods and apparatus for controlling or measuring the thickness of material layers which are accessible only from one side or not at all, wherein a continuous, frequency-modulated ultrasonic signal that periodically scans a frequency band is transmitted and wherein the signal resulting from interference is evaluated with respect to the amplitude.

2. Prior Art

Measurement of layer thicknesses is necessary for controlling thicknesses of coatings, such as protective layers or deposits, corrosion of tube wall thicknesses, and for depth determinations and many other applications. Optical, electric and magnetic methods are known for these applications, but these are limited to specific materials and frequently cannot be used for inaccessible layers below the surface.

Contactless and nondestructive testing by means of ultrasonics permits even such regions of a workpiece to be examined which are inaccessible from outside. Ultrasonic thickness measurements based on the evaluation of propagation delay using the pulse-echo technique can be made by means of commercially available apparatus. If the layer thicknesses are, however, so low that the echos from the upper and lower layer surfaces superpose to give one single signal whose structure cannot be resolved in the time domain, the conventional propagation time method fails. In such cases frequency analyzing methods have already been applied wherein the layer thickness was determined from the so-called Cepstrum of the resulting signal. As the pulse duration cannot be arbitrarily reduced, the propagation time method is only applicable to a limited extent, i.e., to relatively thick layers, and the Cepstrum method is calculation-intensive and thus involves a high expenditure of time and cost.

In addition, ultrasonic thickness measuring instruments are known which are equipped with a sound emitter and a HF generator whose frequency is continuously varied with in specific ranges. These involve measurement of the frequencies at which resonance occurs and determination of the layer thickness from these frequencies. It is possible to make a sound audible in the head phone in case of resonance. The relevant frequency or layer thickness can then be directly read off from a numerical display. In these methods the sound cause by resonance gives no indication of the layer thickness. Furthermore, if the layer thickness has to be determined on larger areas or distances, the observer can only get an impression of the result if he continuously observes the oscilloscope screen, other indicating instruments or a record. These methods are too time-consuming for fast routine inspections.

BROAD DESCRIPTION OF THE INVENTION

The object of the present invention therefore is to provide a method to continuously monitor and control even very thin layers having thicknesses down to a few micrometers, without any manual adjustment of the measuring instruments. The change of thickness in particular of covered layers should become obvious to the observer by periodicities in the frequency spectrum or as an auditory sensation. Furthermore, the method should provide information on the surface structure, e.g., on the roughness of the layers.

It has been found that this object can be achieved by a method of the type described above, when the frequency band is so wide that a multiple of the interference interval is covered and when the signal produced by multiplicative mixing with the transmitted signal is subjected to frequency analysis, a specific modulation rate is determined as a function of the desired measuring range. An alternative solution to the problem consists in the evaluation of the ratio of harmonic amplitudes, the harmonics being produced if a narrow frequency band is selected so that only part of the frequency interval or of the interference patterns is covered and if the repetition frequency of the modulation is fixed for each desired measuring range. According to a preferred embodiment of the method according to the invention, a reference depth is produced by delaying the transmitted signal and mixing it multiplicatively with the resulting signal. This method is particularly suited to determine the surface structure of layers which are not accessible from the outside.

Several preferred or favorable embodiments and apparatus for the implementation of the invention method are as follows:

An audio frequency proportional to the layer thickness preferably is used as an indicator, plus, in order to achieve an audible frequency, a specific modulation rate is determined as a function of the audio frequency variation per layer thickness unit. Preferably the ratio of harmonic amplitudes is evaluated as a sound signal and used as an indicator, and the repetition frequency of modulation and several of its harmonics are selected to be in the audible range.

Advantageously a probe head consisting of a transmitting transducer and a receiving transducer is connected with a sweep generator with adjustable bandwidth and modulation rate, the signal generated at the receiving transducer being rectified in a demodulation unit and, after low-pass filtering, fed into a frequency analyzer or audio monitor. Preferably a frequency voltage transducer is available for calibration, whose output voltage can be multiplied by an adjustable voltage in a multiplier. Preferably there is a probe head consisting of a transmitting transducer and a receiving transducer which is connected with a sweep generator of adjustable bandwidth and modulation rate—a frequency analyzer, e.g., frequency tracking filter or a Fourier analyzer, is available, by means of which the amplitudes of the fundamental wave and of the harmonics in the signal demodulated in a demodulator are determined (the ratio of harmonic amplitudes and the bandwidth of the ultrasonic sweep being used for thickness indication). An audio monitor is provided if desired in the last situation. In order to adjust a specific ratio of harmonic amplitudes, preferably a feedback control loop is formed by adding a reference-value comparator stage and a feedback stage—the thickness indication being derivable from the control voltage for the bvandwidth. Preferably a divider is provided for calibration, in which an adjustable constant is divided by a quantity proportional to the bandwidth. Preferably a delay unit and a multiplicative mixer are provided for the transmitted signal. Also, preferably the transmitting transducer and the receiving transducer are arranged parallel or concentrically in the probe head.

In the case of the first method, the spectral maxima or minima are evaluated which occur periodically in the frequency spectrum of the received signal. Besides the direct evaluation of the maxima or minima by an observer at the display or by a computer, it has been found useful to convert the maxima or minima which recur periodically over frequency and—as a consequence of linear frequency modulation—also over time into an audio frequency signal. At a fixed modulation rate of the transmitted signal, a fixed relationship is obtained between the repetition frequency of the maxima or minima in the spectrum and the thickness of the layer under examination. The repetition frequency increases with increasing layer thickness.

In the method according to the invention, the periodically recurring interference effects produced by partial reflection from the interfaces are observed and the information on the thickness contained in the amplitude modulation is evaluated by means of an electric analyzing instrument or possibly by hearing. The method is based on the following theoretical considerations.

The signal transmitted to the layer to be controlled interferes with the signals reflected from the interfaces. The propagation time difference $\tau$ at layer distance d amounts to:

$$\tau = 2 \, d/c$$

wherein c is the velocity of sound. Variation of the frequency f of the transmitted signal results in a characteristic interference pattern with periodically recurring level changes whose frequency or interference interval Q is:

$$Q = 1/\tau$$

If a linearly frequency-modulated signal, i.e., a so-called sweep with the modulation rate m, $$M = B/T$$

is used, wherein B is the sweep width and T the wobble period, the number f of the interference cycles scanned per second is $$f = m\tau.$$

By selecting an appropriate modulation rate, it is possible to place f in the audio-frequency range. This translation of the layer thickness into the repetition rate of the interference pattern is designated as distance or depth coding. The sensitivity b of depth coding is:

$$b = \Delta f / \Delta d = 2m/c.$$

At high sensitivities, a given frequency interval, e.g., the measuring range of an analyzer, is covered in the case of low variations in layer thickness. If no additional measures were taken, the method would thus be limited to small layer thicknesses. If it is sufficient, however, to determine the variations in distance of a layer boundary, it is possible to adjust a freely selectable working depth: $d_o$ according to the following method. The reference signal is delayed by an amount $\tau_o$ by means of a delay unit. Thus, the working depth $$d_o = c\tau_o/2$$

is coded by the frequency of 0 Hz.

To measure the thickness of a material in which the velocity of sound is c=3000 m/s, the working depth is $d_o$=6 mm and the sensitivity is b=500 Hz/mm, the modulation rate $$m = cb/2 = 750.10^6 \, s^{-2}$$

has to be adjusted at a delay of:

$$\tau_o = 2 \, d_o/c = 4.10^{-6} \, s.$$

If the measuring range is limited, e.g., by a low-pass filter, to 5 kHz, the depth measuring range is between 6 mm and 16 mm. The necessary sweep range can be realized, for example, by a signal which decreases linearly and periodically from 5 MHz to 2 MHz with a sweep period of 4 ms. The line interval in the frequency spectrum is then 250 Hz.

To compensate for the material- and temperature-dependent sound velocity, the device according to the invention can be calibrated for absolute measurements. The layer thickness:

$$d = fc/2 \, m$$

is obtained by multiplying the repetition frequency of the interference pattern by the calibration factor c/2 m. The two factors are represented by voltage values and multiplied in an appropriate unit. The calibration factor is either adjusted on a scale or determined by means of a reference measurement. In this reference measurement the indication obtained for a known layer thickness of the material concerned is adjusted by setting a calibration unit to the correct value. In the case of very thin layers, the interference interval may become so large that the transducer bandwidth no longer contains more than one interference period. At a velocity of sound of 300 m/s, for example, the interference interval of a layer of 0.1 mm in thickness is 15 MHz. As the bandwidth of commonly used transducers often is smaller than 15 MHz, it does not contain a multiple of this interference period. According to the invention only part of the interference interval or pattern is periodically scanned by the transmitted signal in such cases. The repetition rate is selected to be in the lower part of the measuring range of the analyzer, e.g., 1 kHz. The interference-dependent amplitude modulation then represents a segment of the interference pattern for the object to be measured, this segment being scanned periodically in 1 kHz rhythm according to the repetition rate. The frequency spectrum of the amplitude modulation contains the fundamental frequency, in the example selected 1 kHz and its harmonics. If the center frequency of the test signal is at a defined point of the interference curve, e.g., at the maximum, the ratio of the harmonic amplitude depends only on the bandwidth and the interference interval, i.e., on the thickness of the layer. The ratio of the harmonic aplitudes and the adjusted bandwidth then provide unambiguous information on the layer thickness. The ratio of harmonic amplitudes can be determined both by hearing and by means of instruments, e.g., frequency tracking filters or Fourier analyzers. The bandwidth used can be read off from the setting of the sweep generator. To determine the layer thickness according to this harmonic method, first a narrow-band acoustic signal is transmitted and the frequency at which an interference maximum occurs is selected. Then the bandwidth is increased until a specific ratio of harmonic amplitudes is reached. The bandwidth in combination with the ratio of harmonic amplitudes can be used to derive the layer thickness. For absolute measurements, the reciprocal value of this bandwidth is multiplied by a constant factor which—as outlined above—can be adjusted by means of a calibration measurement.

This means that at a given layer thickness and a fixed bandwidth a specific ratio of harmonic amplitudes exists. This ratio varies with the layer thickness, and it is perceived as variation in sound if the measuring range is in the audio frequency range. For routine inspections it is therefore useful to adjust a specific sound and to monitor the sound variation.

The layer thickness measurements performed according to the present invention permit dynamic measurement and control of layer thickness, either by frequency analyzers or by hearing, and thus facilitate the examination process. Changes in layer thickness thus are particularly easy to recognize. Display and documentation of the test result can also be reliably effected. In contrast to the propagation time method, the method according to the invention involves superposition of partially overlapping echoes. It thus also permits measurement of very low layer thickness and at the same time has the general advantages of ultrasonic inspection.

BRIEF DESCRIPTION OF THE DRAWINGS

Further details, advantages and potential applications of the invention result from the following description which is based on the attached schematic drawings. In the drawings.

DETAILED DESCRIPTION OF THE INVENTION

The apparatus according to the invention is an ultrasonic tester with periodically frequency-modulated continuous signal, the layer thickness being translated into a periodically recurring pattern by demodulating the heterodyned signal. The period of the pattern becomes shorter with increasing layer thickness and longer with decreasing layer thickness. In the case of thin layers whose frequency code is around or below the repetition frequency of the transmitted signal, the repetition frequency including harmonics is within the scanning frequency range, the content of harmonics increasing with the layer thickness.

Figure 1:
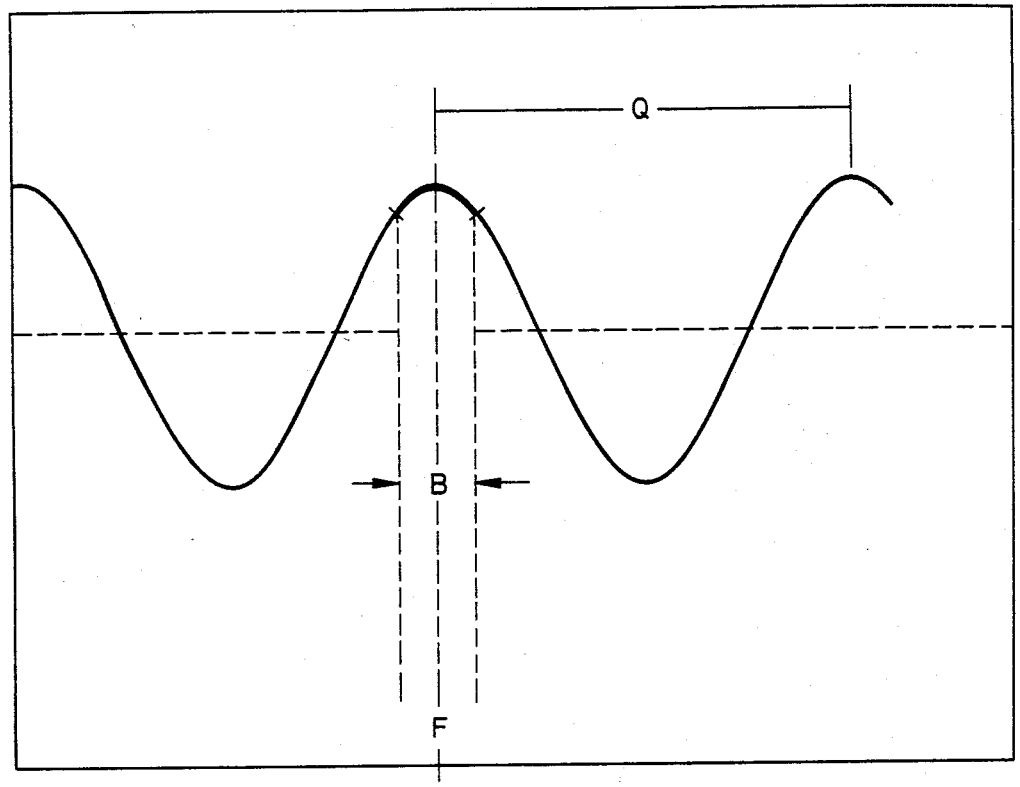
FIG. 1 shows a diagram showing the selection of an appropriate frequency band by the harmonics method according to the invention.

In FIG. 1 the center frequency of the frequency-modulated transmitted signal is placed at an interference maximum or minimum and the bandwidth is selected so large that the scanning frequency range covers one or several harmonics. Q is the frequency interval of the interference maxima.

One of the most important parts of this device is the sweep generator 1 which generates continuously a series of sweeps of the same type. Thus, the signal of the sweep generator has a linear modulation of frequency (i.e., the frequency variation of the signal is saw-tooth-shaped) and the amplitude of the signal is constant. This signal has definite amplitude and is supplied to a probe head which is an ultrasonic transmitting and receiving transducer.

Figure 2:
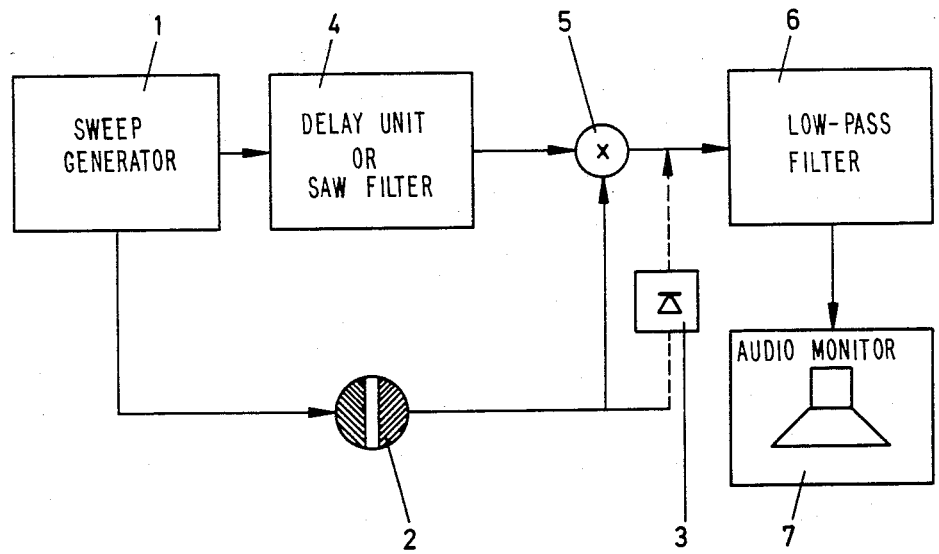
FIG. 2 is a block diagram of one embodiment of the apparatus according to the invention including a delay unit.

Briefly, according to FIG. 2, the signal generated by sweep generator 1 with adjustable bandwidth and modulation rate is fed into probe head 2. The signal produced at the receiving transducer is either directly rectified at 3 or multiplied at 5 by the transmitted signal delayed by a preselectable time in delay unit 4, and, after low-pass filtering 6, fed into audio monitor 7.

As shown in FIG. 2 the ultrasonic signal is transmitted by means of the probe head 2 into the material or layer and is then reflected by the upper and lower surface of the layer to be measured. This superposition results in a new signal which is modulated with respect to its amplitude. The frequency of this amplitude modulation is proportional to the layer thickness. In the subsequent steps, the amplitude modulated signal is analyzed in order to render audible this modulation, or in other words, to generate a sound signal which varies depending on the variation of the amplitude modulation and, thus, on the thickness changes of the layer.

The analysis (i.e. the demodulation of the signal received by the probe head 2) is carried out according to known methods. The signal received is then supplied to the multiplier 5 and multiplied with the signal of the sweep generator 1 which is time delayed in a delay unit 4 prior to the multiplication step. The sweep signal is delayed in order to compensate for the ultrasonic transition delay within the material between the probe head 2 and the layer to be measured. The product of the multiplication is then low-pass-filtered in unit 6 in order to evaluate the frequency difference of the signals received from delay unit 4 and probe head 2. The voltage of the signal at the output of the low-pass-filter 6 is proportional to the frequency difference and, thus, proportional to the thickness of the layer.

Figure 3:
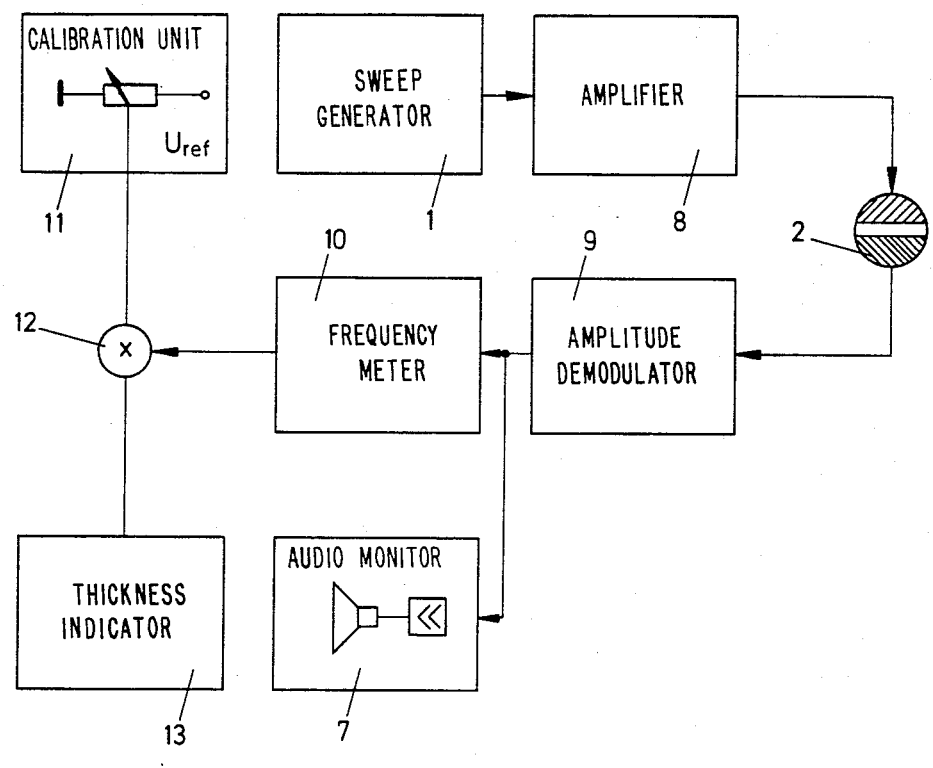
FIG. 3 is a block diagram of another embodiment which includes a calibration unit.

In the ambodiment shown in FIG. 3, sweep generator 1, amplifier 8, probe head 2, amplitude demodulator 9 and audio monitor 7 are used. In addition, thickness indicator 13 in conventional form, e.g., a numerical display printout or strip chart, is controlled by means of frequency meter 10 and calibration unit 11 with multiplier 12. Instead of amplitude demodulator 9, it is also possible—as in FIG. 2—to use a rectifier or multiplier and a low-pass filter.

In more detail the embodiment of the device shown in FIG. 3, all of the above mentioned units are present. In this device a thickness reading is possible in addition to the audible thickness indication. The additional units shown in FIG. 3 are described below.

In an amplifier 8 the signal of the sweep generator 1 is amplified. The amplitude demodulator 9 corresponds to the multiplier 5 and low-pass-filter 6 units shown in FIG. 2. Thus, the output signal of amplitude demodulator 9 corresponds to the output signal of the low-pass-filter 6 shown in FIG. 2.

According to the embodiment of FIG. 3, the signal of the demodulator 9 is supplied to a frequency meter 10 in order to obtain a numerical value for the thickness indicator 13.

The term "frequency meter" means a frequency-to-voltage converter. The output signal $U_{FV}$ of the frequency-to-voltage converter 10 is proportional to the frequency "f" of the input signal and is $U_{FV}=af$, "f"

being the frequency of the input voltage and "a" being a known instrument parameter. Frequency-to-voltage converters are well known in the art and available as electronic chips, for example, the Type VFC42 supplied by the Burr-Brown Research Corporation, International Airport Industrial Park, P.O. Box 11400, Tucson, Arizona 85734.

The probe head 2 receives a signal which scans $f=mt$ interference cycles per second and, thus, shows an amplitude modulation with the frequency "f" as explained above.

As a consequence, the demodulator 9 supplies an output voltage in which the frequency is "f". The frequency-to-voltage converter 10 has, according to the above mentioned explanation, an output voltage $U=af$. The layer thickness "d" and frequency "f" are proportional, so that $d=fc/2m$. The output voltage of the frequency-to-voltage converters 10 is therefore $U_{FV}=2admc/c$.

In the calibration unit 11 a voltage $U_{Cal}$ is set, which is multiplied with $U_{FV}$ in the multiplier 12. The input voltage of the thickness indicator 13 is, therefore, $U_{Instr}=U_{Cal}\times U_{FV}=2admU_{Cal}/c$. The indication $d_{Instr}$ of the thickness indicator is proportional to its input voltage according to the equation $d_{Instr}=kU_{Instr}$, with "k" being a scale factor. Therefore, the thickness indication is $d_{Instr}=2a_c dmk\times U_{Cal}$.

The calibration unit 11 can be adjusted in two different ways:

(a) $U_{Cal}$ can be calculated according to the equation $$U_{Cal}=c/(2amk)$$

with c the sound velocity in the material to be controlled;
a the sensitivity of the frequency-to-voltage converter;
m the modulation rate; and
k the scale factor of the thickness indicator.

This value is used for the adjustment of the calibration unit 11.

(b) The adjustment can also be carried out by the use of a material with a known thickness "d" and sound velocity "c". The probe head 2 is coupled with this material. The calibration unit 11 is then adjusted such that the thickness indicator 13 shows the known value "d", i.e., $$d_{Instr}=d_o$$

So the condition $$U_{Cal}=c/(2amk)$$

is complied.

This explanation can be demonstrated by the following example on the basis of material with a thickness of $d=10^{-3}$m and a sound velocity of $c=2000$ m/s.

The modulation rate of the sweep generator 1 is set as $m=1$ MHz/ms$=10^9$ s$^{-2}$ so the frequency is $f=2md/c=1$ kHz. Assuming the sensitivity of the frequency-to-voltage converter is $a=10^{-3}$ V/Hz and the scale factor of the thickness indicator is $k=10^{-3}$ m/V, the voltage of the calibration unit must then be adjusted as $U_{Cal}=c/(2amk)=2000/(2.10^{-3}.10^9.10^{-3})=1$ and the thickness is $d_{Instr}=2admk\ U_{Cal}/c=2.10^{-3}.10^{-3}.10^9.10^{-3}/2000=10^{-3}$m as desired.

Figure 4:
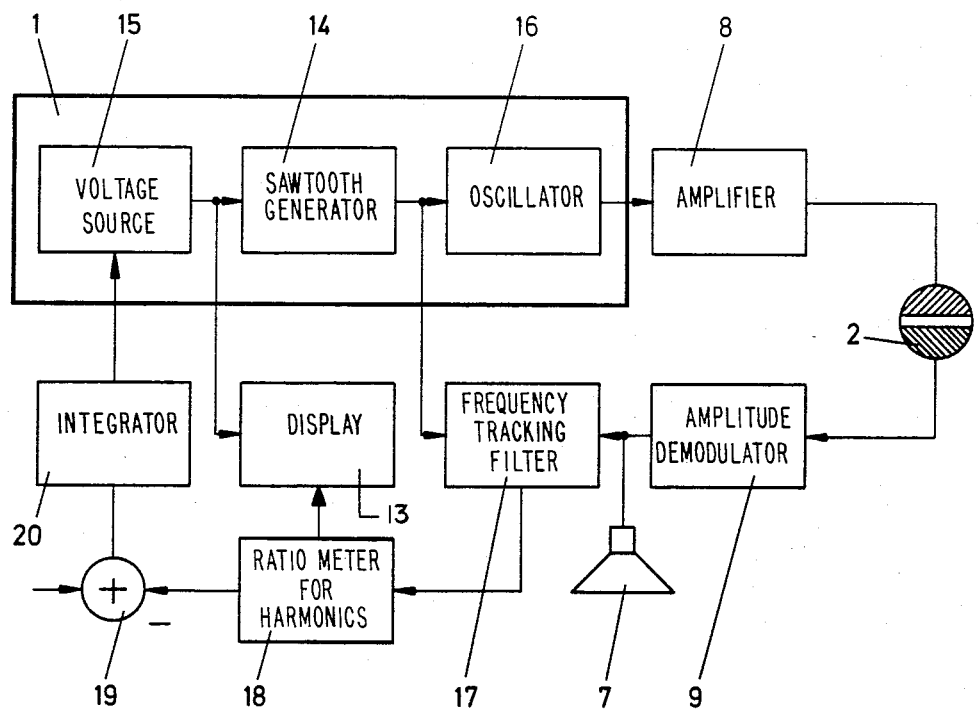
FIG. 4 shows the block diagram of one embodiment and a basic configuration of a feedback-control loop for determining the thickness on the basis of the ratio of harmonic amplitudes.

Briefly, the apparatus shown in FIG. 4 is suitable for layer thickness measurement by analysis of the ratio of harmonic amplitudes. Sweep generator 1 is implemented preferably by series connection of amplitude-controlled saw-tooth generator 14, adjustable voltage source 15 and voltage-controlled oscillator 16. The bandwidth is adjusted by setting saw-tooth amplitude 14 by means of a reference voltage in 15. The repetition rate of frequency modulation is adjusted at saw-tooth generator 14, the center frequency is adjusted at oscillator 16, and the test signal level is adjusted at the amplifier 8. Probe head 2, amplitude demodulator 9 and audio monitor 7 correspond to those in the above embodiments. The amplitudes of the fundamental and of the harmonics are determined by means of frequency tracking filter 17 and a unit for measuring the ratio of harmonic amplitudes 18. The bandwidth and the ratio of harmonic amplitudes are represented on display unit 13. In this embodiment, manual adjustment of the bandwidth is replaced by a control unit, wherein the ratio of harmonic amplitudes is compared with a nominal value in substraction unit 19, and the difference is fed back to bandwidth adjustment via integrator 20. The feedback control loop automatically adjusts the given ratio of harmonic amplitudes.

In the embodiment shown in FIG. 4 the frequency bandwidth of the sweep is adjusted in a different way, as compared with the embodiments of FIGS. 2 and 3, to a narrow bandwidth. The output signal of the amplitude demodulator 9 is fed according to FIG. 4 to a frequency tracking filter 17 which consists of a plurality of filters. The frequency of the first filter is tuned to the repetition frequency of the saw-tooth-generator 14 (fundamental). The remaining filters are tuned to the integer multiples for the repetition frequency of the saw-tooth-generator 14 (harmonics). The output of each filter of unit 17 shows the amplitude of the corresponding harmonics. The ratiometer for harmonics 18 measures the ratio between the amplitudes of the harmonics and fundamental. The sum of these ratios indicates the layer thickness.

In more detail the sweep generator continuously scans a frequency band B, thus, the curve segment shown in FIG. 1 is also repeated. At the output of the demodulation unit 9 the waveform can be demonstrated as follows:

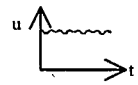

in case the thickness is constant. By changes in the thickness this waveform is also changed. As a consequence, the variation of the wave form at the output of the demodulator 9 depends on the variation of the layer thickness. The variations of the waveform are characterized by the ratio of the harmonic amplitudes, which, in this case, can be defined as harmonic distortion. At the output of the ratiometer 18 this harmonic distortion is obtained and compared with a nominal harmonic distortion supplied as second input to the subtraction unit 19. The difference is then fed back to the adjustable voltage source 15 of the sweep generation unit 1. In this manner a suitable bandwidth of the sweep generator can be adjusted. The ratiometers for harmonics are well known in the art. All spectrum analyzers or Fast-Fourier analyzers can be used as ratiometers.

The device shown in FIG. 4 is particularly suited for application in search technique, because deviations in the ratio of harmonic amplitudes from a value previously determined for a reference layer can easily be detected by hearing or by the electronic analyzer.

I claim:

1. An apparatus to determine a thickness of a material layer, comprising:
    (a) a sweep generator to generate an ultrasonic signal which covers a multiple of an interference interval, the sweep generator has:
        (i) an adjustable band width; and
        (ii) an adjustable modulation rate;
    (b) an amplifier to amplify the generated signal;
    (c) a transmitting transducer to transmit the amplified signal into the material layer wherein the transmitted signal is reflected from surface interfaces of the material layer resulting in interference signals;
    (d) a receiving transducer to receive the interference signals from the material layer;
    (e) an amplitude demodulator to demodulate the received signals; and
    (f) a means to analyze frequencies of the demodulated interference signal and correlate the frequencies of the interference signal to a thickness measurement of the material layer.

2. An apparatus according to claim 1 wherein said means to analyze frequencies has a multiplier to mix signals from a frequency meter receiving the demodulated signal with a delayed signal of a known frequency from a calibration unit.

3. A method for determining a thickness of a material layer, which is accessible from at most one side of the material layer comprising:
    (a) adjusting a sweep generator:
        (i) to a center frequency of an interference maximum of the material layer, and
        (ii) to a band width wide enough to cover a multiple of an interference interval of the material layer;
    (b) generating an ultrasonic signal from the sweep generator;
    (c) amplifying the generated ultrasonic signal;
    (d) transmitting the amplified ultrasonic signal into the material layer from a transmitting transducer;
    (e) receiving from the material layer by a receiving transducer an interference signal which results from reflections of incident waves from surface interfaces of the material layer;
    (f) demodulating in an amplitude demodulator the received interference signals from the material layer;
    (g) analyzing the demodulated interference signals by a means to determine frequencies of the demodulated interference signals; and
    (h) correlating the analyzed frequencies of the demodulated interference signals to a thickness measurement of the material layer.

4. An apparatus to determine a thickness of a material layer, comprising:
    (a) a sweep generator with an adjustable band width and an adjustable modulation rate to generate an ultrasonic signal which covers only a portion of an interference interval, the sweep generator has:
        (i) a voltage source;
        (ii) a saw tooth generator; and
        (iii) an oscillator;
    (b) an amplifier to amplify the generated signal;
    (c) a transmitting transducer to transmit the amplified signal into the material layer wherein the transmitted signal is reflected from surface interfaces of the material layer resulting in harmonic signals;
    (d) a receiving transducer to receive the harmonic signals from the material layer;
    (e) an amplitude demodulator to demodulate the harmonic signals; and
    (f) a means to analyze ratios of harmonic amplitudes of the harmonic signals and correlate the ratios of harmonic amplitude of the harmonic signals to a thickness measurement of the material layer.

5. An apparatus according to claim 4 wherein the means to analyze ratios of harmonic amplitudes has:
    (i) a frequency tracking filter which receives a signal from the saw tooth generator and the demodulated harmonic signals; and
    (ii) a meter for measuring harmonic amplitudes.

6. A method for determining a thickness of a material layer, which is accessible from at most one side of the material layer comprising:
    (a) adjusting a sweep generator:
        (i) to a center frequency of an interference maximum of the material layer; and
        (ii) to a band width narrow enough to cover only a portion of an interference interval of the material layer;
    (b) generating an ultrasonic signal from the sweep generator;
    (c) amplifying the generated ultrasonic signal;
    (d) transmitting the amplified ultrasonic signal into the material layer from a transmitting transducer;
    (e) receiving from the material layer by a receiving transducer harmonic signals which result from reflections of incident waves from surface interfaces of the material layer;
    (f) demodulating in an amplitude demodulator the received harmonic signals from the material layer;
    (g) analyzing the demodulated harmonic signals by a means to determine ratios of harmonic amplitudes;
    (h) correlating the ratio of harmonic amplitudes of the analyzed signal to a thickness measurement of the material layer.

* * * * *